June 13, 1944.  W. A. LEBUS  2,351,526
GAS TANK FITTING
Filed Feb. 12, 1942  2 Sheets-Sheet 1

Witness:
V. Siljander

Inventor
William A. Lebus.
By
Lee & Lee
Atty's

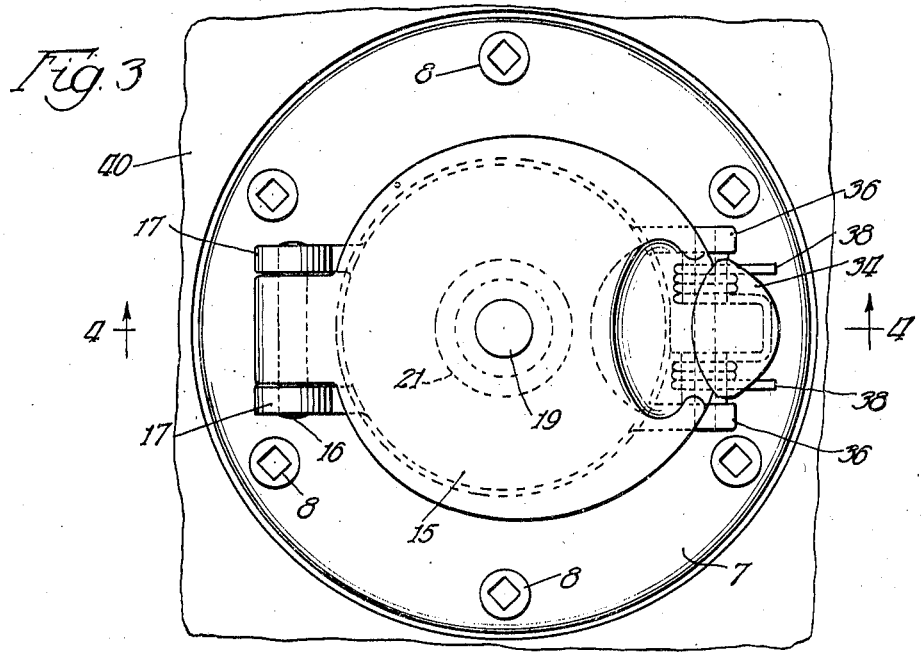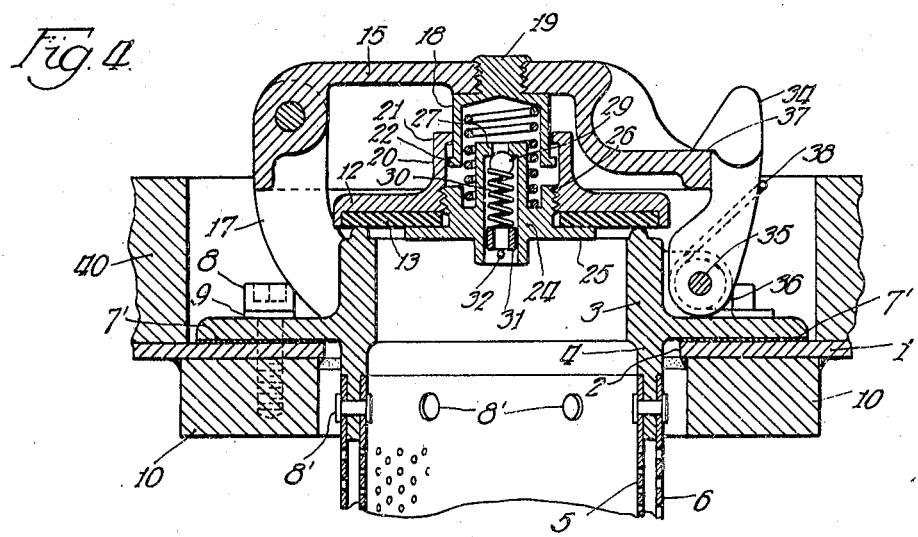

Patented June 13, 1944

2,351,526

UNITED STATES PATENT OFFICE 2,351,526

GAS TANK FITTING

William A. Lebus, Chicago, Ill., assignor to Protectoseal Company of America, Inc., Chicago, Ill., a corporation of Illinois Application February 12, 1942, Serial No. 430,544

6 Claims. (Cl. 220—44)

My invention belongs to that general class of devices known as tank fittings and relates more particularly to a cap for tanks containing gasoline or the like, and particularly a cap for fuel tanks on heavy combat vehicles.

The invention has among its objects the production of a simple, compact, durable, leakproof, efficient and satisfactory cap for gasoline fuel tanks or the like, particularly for fuel tanks on heavy armored combat vehicles.

The invention has particularly as an object, the production of a leakproof cap of the kind described which is particularly compact and which also provides a fire or flame baffle assembly which projects into the tank.

The invention also has among its objects the production of a device that is exceedingly simple and not likely to get out of order nor be readily injured, and which may be readily applied or removed.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 3 is a plan view of my improved fitting;

Fig. 4 is a sectional view taken substantially on line 4—4 of Fig. 3; and

Figure 1:
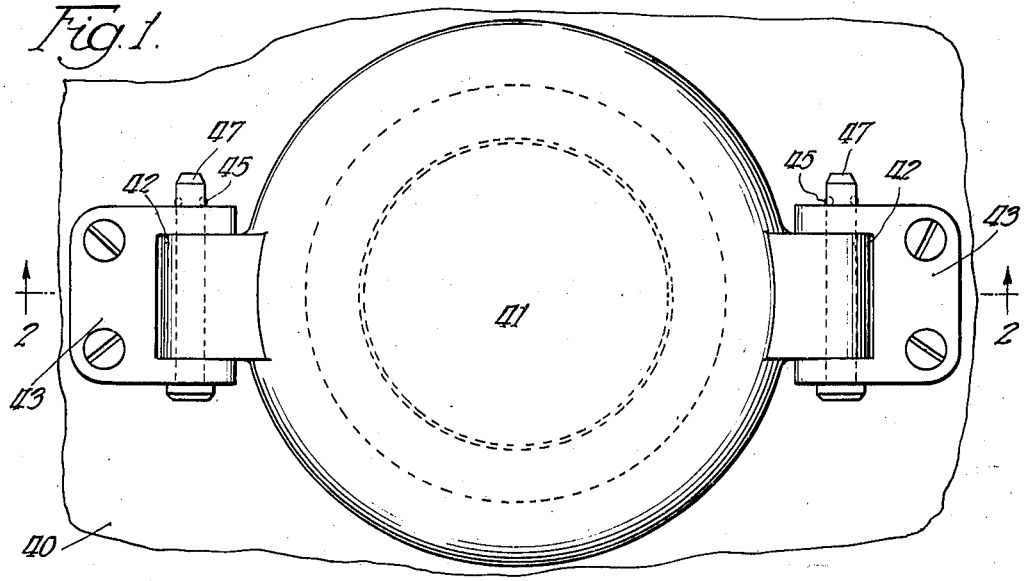
Fig. 1 is a plan view of the device with the closure 41 secured in place.
Figure 2:
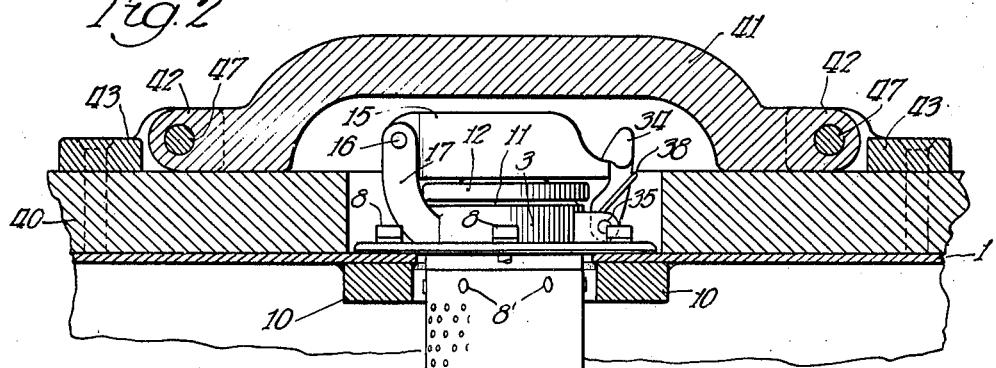
Fig. 2 is a sectional view taken on line 2—2 of Fig. 1, showing my fitting in elevation as applied to a tank.

Referring to the drawings, 1 represents a portion only of a fuel tank of the desired size and shape or configuration provided with an opening 2 for filling purposes. The discharge opening from the fuel tank is not shown. Arranged on the tank at the filling opening is a body member 3 which is provided with a tubular flange 4 projecting through the opening 2 to the interior of the tank and which carries flame baffling members 5 and 6, preferably in the form of perforated metal tubes which are closed at the bottom in any suitable manner. The body member 3 is provided with an annular flange 7 extending exteriorly about the same and adapted to seat on the wall of the fuel tank and be secured in place by screws or bolts 8 or their equivalent engaging with the wall of the tank and a reinforcing ring 10 secured at the interior of the tank. I also prefer to provide lock washers 9 under the heads of the bolts 8 and a gasket 7' between the flange 7 and the tank wall so as to afford leak-tight joint.

The body member 3 is provided with a valve seat 11 at its outer end extending about the same, and arranged to cooperate with a pressure valve member 12 constituting a cap which is provided with a gasket 13 of suitable material, preferably such material as would not be affected by gasoline or like fluids. Arranged over the cap or valve member 12 is a hood 15 which is secured to the body member by a pin 16 or its equivalent extending through ears 17 on the body member. The hood 15 carries a tubular member 18 which is secured to the hood by means of a stud 19 which is swedged over at its outer end as shown. The valve or cap 12 is provided with a flanged portion 20 which is provided with a shoulder or internally extended flange 21 arranged to cooperate with an external flange 22 on the member 18. Arranged within the cap 12 and secured thereto is a tubular member 24 preferably externally flanged as indicated at 25 to underlie gasket 13, and provided with an extending portion 26 arranged for threaded engagement with cap 12. The member 24 extends outwardly as indicated at 27 and interiorly flanged at the end to form a seat for a ball valve 29 which constitutes a vacuum relief valve. A spring 28 arranged in member 18 engaging therewith and with the member 24, normally tends to maintain the valve 12 on its seat 11 when the hood 15 is locked in its closed position. The vacuum valve 29 is normally maintained on its seat by a spring 30 bearing against the valve and against a valve washer or tubular bushing 31 which is secured in place by a pin 32 or equivalent means.

The hood 15 is normally maintained in closed position, maintaining the valve 12 on its seat, by means of the latch or locking member 34 pivotally secured to the ears 36 on the body member by means of pin 35. As shown the locking lever or latch is provided with an extending portion 37 adapted to overlie and engage the top of the hood member 15. A spring 38 tends to normally maintain the latch in the position shown in the drawings and thereby holding the hood down, compressing the spring 28, thereby yieldingly maintaining the pressure valve 12 on its seat 11.

Figure 5:
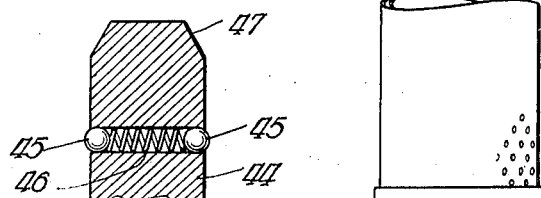
Fig. 5 is a sectional view through a portion of one of the closure securing members.

As shown the top of the tank 1 is heavily armored by an armor plate 40 provided with an opening through which the fitting projects. There is also provided an armored cover 41 which is provided at opposite sides with ears 42 arranged to extend between the ears 43 on the plate 40 and be secured in place by pins 47, the cover 41 being substantially hinged at both sides so that upon removing one or the other of the pins it may be turned over at either side. The pins are also arranged so that they may be readily slipped out. As shown the pins 47 project through the ears 43 and 42 and are provided with detents or balls 45 in the stem portion 44 of the pins (see Fig. 5), spring pressed as indicated at 46, so that they are releasably held in place. Either one or both may be withdrawn, permitting the cover to be turned back or to be entirely removed. Any equivalent arrangement may be employed.

To refuel the tank, the cover 41 may be raised or removed, then the hood 15 released by moving the latch member 34 at which time the hood will be thrown up by the spring 28 and may be opened up, carrying with it the pressure valve 12 and associated parts. After the tank is filled, the hood may be closed down and latched, carrying with it the valve 12 and maintaining it upon its seat 11. In case of excessive pressure within the tank, the valve 12 will be opened by the internal pressure, the spring 28 being compressed. This will relieve the pressure, as the confined vapors may flow over the valve seat 11 to the exterior of the fitting, the valve dropping back in closed position as soon as the pressure is relieved. Should there be a vacuum produced in the fuel tank, as for example, due to the withdrawal of the contents of the tank through a discharge opening or conduit (not shown), this vacuum is relieved by air passing under the hood, past the flange 21 and flange 22, thence into member 18 and through member 24 past the vacuum valve 29 and through the tubular washer or bushing 31 into the tank.

It is thus seen that I have a compact device adapted to close or seal a tank at the filler opening which will relieve excess pressure or relieve or break the vacuum within the tank, the device likewise being constructed to prevent the passage of fire or flame into the tank causing an explosion.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A closure of the kind described for tanks having a filling opening, comprising a tubular body member arranged for securement on the tank at the filling opening and provided with a valve seat at its open outer end, a valve carrying member pivotally secured to said body member, means for releasably securing said valve carrying member in operative position, a pressure relief valve cooperating with said valve seat, means for adjustably securing said valve to said valve carrying member, including telescopic sleeves carried by the valve carrying member and valve respectively, said sleeves having annular flanges disposed in overlapping relationship to limit the separation of said sleeves and to provide a substantially enclosed chamber having an air passage opening past said flanges, and a spring actuated vacuum relief valve located in said chamber and carried by said pressure valve.

2. A closure of the kind described for tanks having a filling opening, comprising a tubular body member arranged for securement on the tank at the filling opening and provided with a valve seat at its open outer end, a valve carrying member pivotally secured to said body member, means for releasably securing said member in operative position, a pressure relief valve cooperating with said valve seat, extensible means for adjustably securing said valve to said valve carrying member including means for yieldingly maintaining the valve on its seat when the valve carrying member is in operative position, said extensible means including telescoping sleeves carried by the valve carrying member and valve respectively, said sleeves having annular flanges disposed in overlapping relationship to limit separation of said sleeves and to provide a substantially closed chamber having an air passage opening past said flanges, and a spring actuating relief valve located in said chamber and carried by said pressure valve.

3. A closure of the kind described for tanks having a filling opening, comprising a tubular body member arranged for securement on the tank at said opening and provided with a valve seat at its open outer end, a valve carrying member pivotally secured to said body member, means for releasably securing said valve carrying member in operative position, a pressure relief valve provided with a gasket arranged to cooperate with said valve seat, a tubular stem connected with said valve carrying member for adjustably securing said valve to said member at the lower side thereof, means for yieldingly maintaining said valve on its seat, said valve being provided with a tubular stem, said tubular stems being telescoped one upon the other and having overlapping annular flanges to limit separation thereof, said flanges having clearance between the peripheral edges thereof and the walls of said stems to allow said valve to drop relative to its seat and to permit passage of air, a vacuum relief valve arranged within the confines of the tubular stems, and means for normally maintaining said vacuum relief valve in its closed position.

4. In a fitting of the kind described, a tubular body member provided with a flange about the exterior thereof and having a valve seat at its open outer end, a pressure valve member arranged to cooperate with said seat, and valve carrying means for operatively securing said pressure valve member to the body member, telescoping tubular means for operatively securing said pressure valve member to the valve carrying means and means cooperating therewith for yieldingly maintaining the pressure valve member on its seat, said valve member being provided with an inlet port within the telescoping tubular means, a valve for normally closing said port and means for yieldingly maintaining the last mentioned valve in its closed position, said telescoping means for operatively connecting the pressure valve member to the valve carrying means providing an adjustable connection whereby the valve is seated about the entire face of the valve seat on the open outer end of the body member, said telescoping tubular means comprising radially spaced tubular members connected with the valve carrying means and pressure valve member respectively with oppositely disposed annular flanges carried by said tubular members for circumferentially overlapping each other to guard against ingress of foreign materials between said spaced tubular members and also providing an air passage from the outer atmosphere to said inlet port.

5. A closure of the kind described for tanks provided with a filling opening comprising a tubular body member arranged for securement to the tank at the filling opening and provided with a valve seat at its open outer end, a valve carrying member pivotally mounted on said body member at one side thereof, a latch carried by the body member at the opposite side for securing the valve carrying member in its operative position, a pressure valve arranged to cooperate with said valve seat, said valve having a plate threadedly connected therewith and provided with a tubular vacuum relief valve stem, a gasket arranged between said plate and valve, said valve being provided with an outwardly extending tubular part having an internal flange at its free end, a cooperating tubular part mounted on the valve carrying member and extending within the bore of the tubular part of the valve, said cooperating part being provided with an external flange arranged to engage said internal flange on the tubular part of the valve, a vacuum relief valve in said tubular vacuum relief valve stem arranged to control the venting of the tank through said tubular stem on the plate, and a spring for normally maintaining said pressure valve on its seat when the valve carrying member is in its operating position.

6. A closure of the kind described for tanks provided with a filling opening comprising a tubular body member arranged for securement to the tank at the filling opening and provided with a valve seat at its open outer end, a valve carrying member pivotally mounted on the body member at one side thereof, a latch carried by the body member at the opposite side for securing the valve carrying member in its closed position, a pressure valve arranged to cooperate with said valve seat, said valve having a plate secured thereto and provided with a tubular vacuum relief valve stem, a gasket arranged between said plate and valve, said valve being provided with an outwardly extending tubular part having an internal flange at its free end, a cooperating tubular part connected with the valve carrying member and extending within the bore of the tubular part of the valve, said cooperating part being provided with an external flange arranged to loosely engage said internal flange on the tubular part of the valve, a vacuum relief valve arranged to control the venting of the tank passage through said tubular part on the plate and a spring for normally maintaining said pressure valve on its seat when the valve carrying member is in its operative position.

WILLIAM A. LEBUS.